Aug. 18, 1936.   F. LEISTER ET AL   2,051,304
BEARING SEAL
Filed June 5, 1933
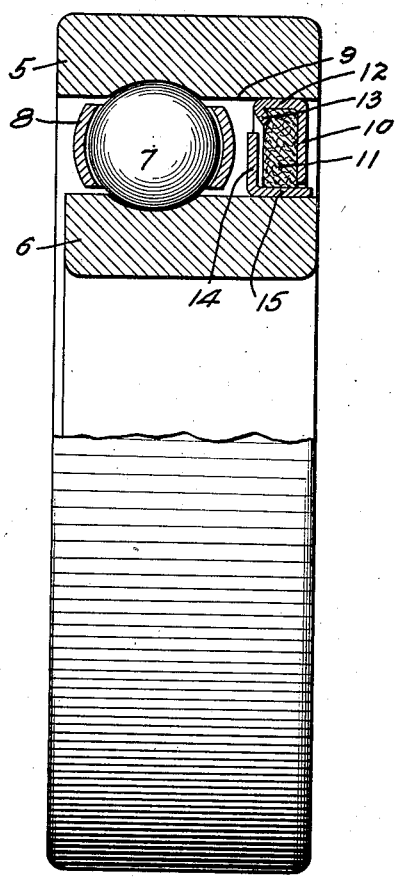
INVENTORS
FAYETTE LEISTER
JOHN W. SMITH
BY
ATTORNEYS Patented Aug. 18, 1936

2,051,304

UNITED STATES PATENT OFFICE 2,051,304

BEARING SEAL

Fayette Leister and John W. Smith, New Britain, Conn., assignors to The Fafnir Bearing Company, New Britain, Conn., a corporation of Connecticut Application June 5, 1933, Serial No. 674,399

1 Claim. (Cl. 286—5)

Our invention relates to an anti-friction bearing, and more particularly to a seal therefor.

It is the general object to provide an exceedingly cheap, efficient seal for an anti-friction bearing.

The drawing shows, for illustrative purposes, a preferred form of the invention embodied in a ball bearing shown in edge elevation, parts being in section.

In said drawing 5 indicates an outer bearing ring, while 6 indicates an inner bearing ring, with interposed anti-friction bearing members, such as balls 7, fitting raceways thereof and which may be held in a cage 8.

The bearing may be sealed at one or both sides, but since the seals at opposite sides may be the same if both sides are to be sealed, the seal at one side only has been illustrated.

In the preferred form the bore or inner surface of the outer ring, as indicated at 9, is ground or otherwise accurately formed. The seal includes a sheet metal plate 10 extending across the space between said rings 5 and 6, and which supports a seal ring, such as the felt ring 11. An inwardly directed flange 12 is provided on the plate 10 and is designed to hold with a tight friction fit in the outer ring bore 9. If desired, means other than the tight friction fit may be employed. The plate 10 and flange 12 constitute what may be termed a cup, the open side of which is directed toward the anti-friction bearing members. The open edge of the cup is preferably crimped over, as indicated at 13, so as to securely hold the felt ring 11 in place.

If desired an oil slinger in the form of a radially outwardly directed plate 14 may be provided and be carried by the inner ring 6. In the form shown the outwardly directed slinger plate or flange 14 is provided with a sleeve portion 15, designed to tightly fit the outer surface of the inner ring 6, and the sleeve 15 is extended so as to form a running bearing surface for the inner edge of the felt seal ring 11. If the sleeve 15 be not provided the felt ring 11 would be extended so as to engage the outer surface of the inner bearing ring 6, and preferably the plate 10 would likewise be wider so as to come nearer the inner ring.

It will thus be seen that we have provided an exceedingly cheap form of bearing seal, which will be effective in retaining lubricant and excluding foreign matter from the anti-friction bearing members and their raceways. The seal parts may be formed of pressed sheet metal, which may be turned out in quantities at small cost. The bearing seal 11 will be securely held and by simple means. As above stated, if means other than a tight friction fit in a properly formed bore or surface of the outer ring is considered insufficient any other well know means may be provided for further securing the seal in place.

While a preferred form of the invention has been described in detail it is to be understood that changes may be made within the scope of the invention as defined in the appended claim.

What we claim is:

Seal means for an anti-friction bearing of the type including an outer bearing ring and an inner bearing ring with interposed anti-friction bearing members, said seal means for interposition between said bearing rings comprising a cup-shaped member tightly fitting within the bore of said outer ring, the bottom of said cup extending across the space between said bearing rings, a seal ring seated on the bottom of said cup, the upper edge of said cup being crimped over and into the body of said seal ring to hold said seal ring in place and against turning in said cup, and an oil slinger ring carried by said inner ring between said anti-friction bearing members and said seal ring, for the purpose described.

FAYETTE LEISTER.
JOHN W. SMITH.